Figure 1:
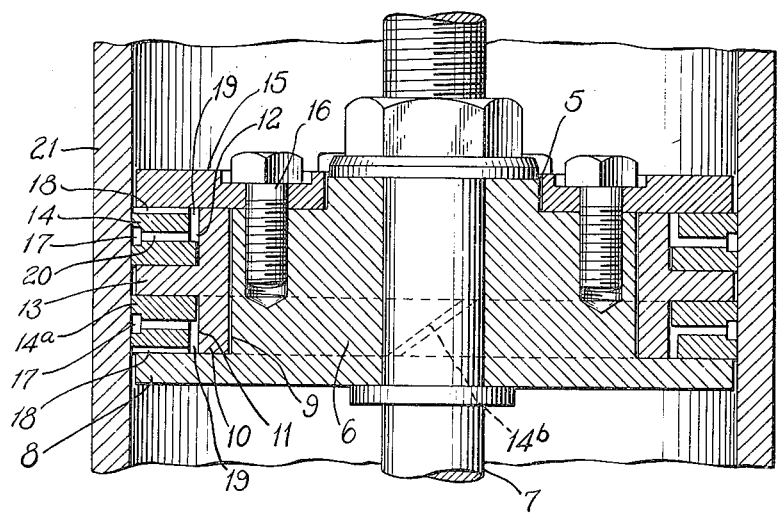

March 19, 1935.  W. B. TOWELL  1,994,491

PISTON RING

Filed April 10, 1933

INVENTOR.
William B. Towell
BY
Howard E. Thompson
ATTORNEY

Patented Mar. 19, 1935

1,994,491

UNITED STATES PATENT OFFICE 1,994,491

PISTON RING

William B. Towell, Jersey City, N. J.

Application April 10, 1933, Serial No. 665,267

2 Claims. (Cl. 309—31)

This invention relates to rings or sealing devices such as commonly employed on pistons, pumps and various other devices to affect a seal between adjacent walls of two bodies; and the object of the invention is to provide a ring of the class described having an annular groove on the outer bearing surface thereof and intermediate the upper and lower surfaces of the ring with means for permitting the prevailing pressure to pass over one side of the ring to the inner surface thereof and then to said annular groove to provide free action of the ring in a cylinder and also to affect a seal which will largely prevent what is known as a blow-by, and in some instances also aid in lubrication of the reciprocating parts; a further object being to provide a ring of the class described, the inner surface of which is reduced at one side portion of the ring to form an annular chamber at the inner surface of the ring, and ports or passages for placing the annular groove of the ring as well as the prevailing pressure in communication with said inner annular recess; a further object being to provide a sealing device or ring structure, a number of which may be coupled with a piston or reciprocating member and exposed to prevailing pressure at both sides of said reciprocating member; and with these and other objects in view, the invention consists in a sealing device of the class and for the purpose specified, which is simple in construction, efficient in use and which is constructed as hereinafter described and claimed.

Figure 2:
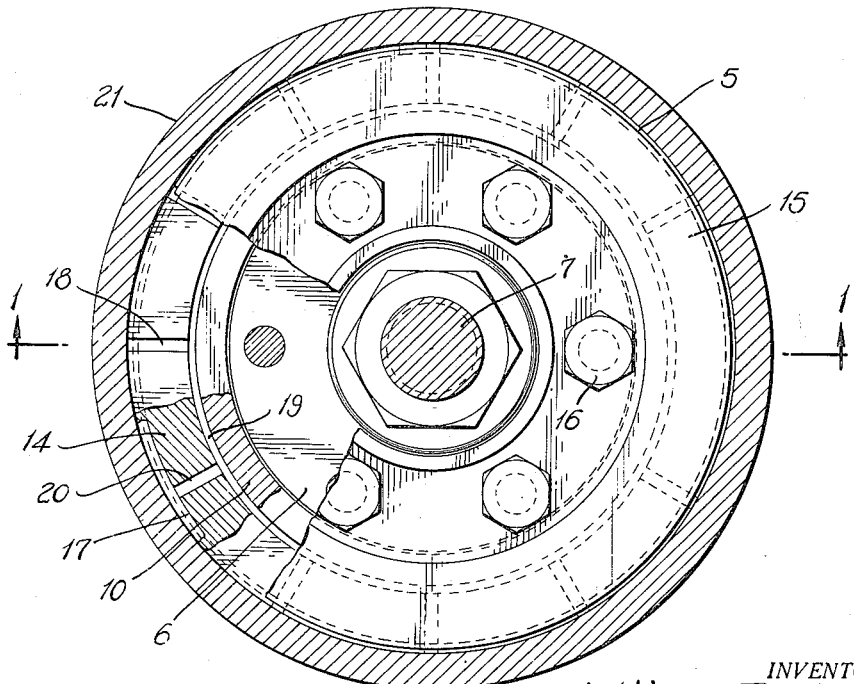

The invention is fully disclosed in the following specification, of which the accompanying drawing forms a part, in which the separate parts of my improvement are designated by suitable reference characters in each of the views, and in which:

Fig. 1 is a sectional view through a piston showing two of my improved rings mounted in connection therewith and indicating part of a cylinder wall, the section being on the line 1—1 of Fig. 2; and, Fig. 2 is a plan and sectional view of the structure shown in Fig. 1.

In the accompanying drawing, I have shown for the purpose of illustrating one method of carrying my invention into effect, a piston 5 of the built up type, consisting of a main body 6 mounted upon the piston rod 7 and including an outwardly extending flange 8 at its lower end forming above the flange a recess 9 in which is arranged a spreader 10 forming two ring grooves 11 and 12 subdivided by a central web or fin 13. At 14 and 14a I have shown two rings made according to my invention and both of which are of the same general construction, and therefore, the brief description of one will apply to both. At 15, I have shown a cap or plate forming the top wall of the piston body 6, and this plate also serves to retain the spreader 10 and rings 14, 14a in position. Screws or bolts 16 are employed for detachably coupling the cap 15 with the body 6. It will be understood that this type of piston is employed where it is desirable to remove the rings from the piston body without detaching the body 6 from the rod 7, especially in large engines, compressors, pumps and the like.

At this time, it will be understood that my invention is not limited to the use of rings in any particular type of piston or plunger structure as the same may be mounted in conventional ring grooves of conventional pistons. It will also be apparent that while the rings 14, 14a are of the split type as indicated at 14b, Fig. 1, these rings may be of the solid or sectional type commonly employed in apparatus of the character described.

My invention consists in providing a ring or sealing device regardless of the method of its construction with an annular groove 17 in the outer bearing surface thereof and inwardly of the side surfaces thereof, which as viewed in the drawing are the upper and lower surfaces of the ring. One of the sides and/or upper and lower surfaces of the ring is provided with a plurality of radial recesses, channels or apertures 18 and the inner surface of the ring adjacent the side having the recesses 18 is reduced to form an annular chamber or passage 19 with which the recess 18 communicates so as to expose the prevailing pressure at one or both sides of a piston or plunger to the annular chamber 19 as is clearly seen in Fig. 1 of the drawing. The chamber 19 is also placed in communication with the annular groove 17 by radial ports 20 spaced circumferentially of the ring so that the said prevailing pressure is also exposed to the annular groove 17.

As seen in Fig. 1 of the drawing, the recesses 18 of the ring 14 are on the upper surface so as to expose the chamber 19 and prevailing pressure at the top of the piston, whereas on the ring 14a, the recesses are on the lower surface so as to expose the chamber 19 of the ring 14a to the prevailing pressure at the bottom of the piston. At this time, it will be understood that if a multiple ring construction is employed at the upper and lower ends of a ring piston body, each ring will be of the same general construction so that in the event of a blow-by when working under high pressures, each successive ring will function in the same manner to the pressure to which the same is exposed and subjected, it being understood that in all cases, the prevailing pressure which is exposed to the outer ring groove of the piston serves to free and ease the frictional engagement of the ring or sealing device on the cylinder wall 21 over which the rings pass in the reciprocating movement of the piston.

From the foregoing, it will appear that by constructing a piston ring or sealing devices in the manner herein described, the desired results are accomplished without in any way modifying or redesigning the structure of conventional pistons, plungers and the like in connection with which the rings are employed and in this respect materially differentiating from such structures as shown in my prior Patent Number 1,867,718 granted to me July 19, 1932, as well as in my prior application bearing Serial Number 592,314, filed by me February 11, 1932, in both of which cases it was essential to construct a special piston or plunger to carry out and perform the desired function and operation of the rings or sealing devices. It will therefore appear that with my present construction which is concentrated to the ring per se, the desired results may be obtained in the most economical manner by reason of the saving in the construction of special pistons or plungers, and furthermore, the ring or sealing device is adaptable to and can be readily installed in pistons and plungers which are now in use and of conventional form, thus making applicant's device an accessory or replacement part which may be sold and installed as such.

It will be understood that various changes in and modifications of the construction of the ring or sealing device herein disclosed may be made within the scope of the appended claims without departing from the spirit of my invention or sacrificing its advantages.

Having fully described my invention, what I claim as new and desire to secure by Letters Patent, is:

1. A device of the class described comprising an annular body having inner, outer and side surfaces, the outer or bearing surface of said body having an annular groove intermediate the side surfaces thereof and one side surface of said body having radial recesses opening through the inner and outer surfaces thereof, said side surface being exposed to the prevailing pressure when the sealing device is in use to permit the passage of the prevailing pressure to the inner surface of the device, the inner surface of said body being cut away to form in conjunction with a ring groove in which the body is mounted, an annular chamber opening through the recessed side surface of said body, and said body having a plurality of circumferentially spaced radial passages for placing said chamber in communication with said groove whereby the prevailing pressure in said chamber may be extended to the groove on the outer surface of said body.

2. A sealing device of the class described comprising a ring having inner and outer side surfaces, the outer surface of the ring having an annular groove intermediate the side surfaces thereof, one side surface of the ring having radial recesses opening through the inner and outer surfaces thereof, the inner surface of the ring being cut away at one corner thereof to form an annular recess communicating with the recessed side surface of the ring, said ring having radial passages spaced circumferentially thereof for placing said annular recess and groove in communication, and the recessed side surface of the ring being exposed to the prevailing pressure when the ring is in use to permit the passage of the prevailing pressure into said annular recess on the inner surface of the ring and to the annular groove on the outer surface thereof through said radial passages.

WILLIAM B. TOWELL.